United States Patent
Leitgeb

(10) Patent No.: US 9,958,017 B2
(45) Date of Patent: May 1, 2018

(54) OIL APPORTIONING

(71) Applicant: MAGNA Powertrain AG & Co KG, Lannch (AT)

(72) Inventor: Stefan Leitgeb, Kainbach bei Graz (AT)

(73) Assignee: Magna Powertrain AG & Co KG, Lannach (AT)

(*) Notice: Subject to any disclaimer, the term of this patent is extended or adjusted under 35 U.S.C. 154(b) by 814 days.

(21) Appl. No.: 14/222,715

(22) Filed: Mar. 24, 2014

(65) Prior Publication Data

US 2015/0267758 A1 Sep. 24, 2015
US 2016/0363176 A9 Dec. 15, 2016

(30) Foreign Application Priority Data

Mar. 28, 2013 (DE) .................. 10 2013 205 649

(51) Int. Cl.
| F16D 13/52 | (2006.01) |
| F16D 13/70 | (2006.01) |
| F16D 13/74 | (2006.01) |
| F16D 23/12 | (2006.01) |
| F16D 13/72 | (2006.01) |

(Continued)

(52) U.S. Cl.
CPC .............. *F16D 13/74* (2013.01); *F16D 13/52* (2013.01); *F16D 13/58* (2013.01); *F16D 13/70* (2013.01); *F16D 13/72* (2013.01); *F16D 23/12* (2013.01); *F16D 2023/123* (2013.01); *F16D 2125/36* (2013.01); *F16D 2300/0214* (2013.01)

(58) Field of Classification Search
CPC .......... F16D 13/52; F16D 13/70; F16D 13/72; F16D 13/74; F16D 2023/123; F16D 2300/0214; F16D 2125/34; F16D 2125/36; F16D 2125/38; F16D 13/58; F16D 23/12

See application file for complete search history.

(56) References Cited

U.S. PATENT DOCUMENTS

| 6,675,943 B2 | 1/2004 | Organek et al. |
| 7,546,914 B2 * | 6/2009 | Schranz ............. B60K 23/0808 192/48.2 |

(Continued)

FOREIGN PATENT DOCUMENTS

| CN | 1168953 A | 12/1997 |
| DE | 3705064 A1 | 5/1998 |

(Continued)

OTHER PUBLICATIONS

Search Report dated Dec. 24, 2015 in corresponding ChinesePatent Application No. 201410122811.9.

*Primary Examiner* — Terry C Chau
(74) *Attorney, Agent, or Firm* — Dickinson Wright PLLC

(57) ABSTRACT

A metering device for controlling an oil delivery rate for a wet-running clutch. The wet-running clutch has at least one pair of interacting friction surfaces and an actuation unit for actuating the wet-running clutch. The actuation unit has an axially supported support disk and an axially displaceable thrust disk, wherein the thrust disk and the support disk are rotatable relative to one another. The metering device has a first component which is connected fixedly with respect to a housing, and a second component which is connected to the thrust disk in a rotationally conjoint and axially relatively displaceable manner.

14 Claims, 7 Drawing Sheets

(51) Int. Cl.
*F16D 13/58* (2006.01)
*F16D 125/36* (2012.01)

(56) References Cited

U.S. PATENT DOCUMENTS

| | | | |
|---|---|---|---|
| 7,753,173 B2* | 7/2010 | Gratzer | B60K 17/344 |
| | | | 184/13.1 |
| 8,388,486 B2 | 3/2013 | Ekonen et al. | |
| 9,394,951 B2* | 7/2016 | Hruby | F16D 13/72 |
| 2010/0101351 A1* | 4/2010 | Lafer | B60K 17/344 |
| | | | 74/467 |
| 2010/0274456 A1 | 10/2010 | Kondo et al. | |

FOREIGN PATENT DOCUMENTS

| | | |
|---|---|---|
| DE | 102011113782 B3 | 10/2012 |
| EP | 0268904 A2 | 6/1988 |
| JP | 2008507675 A | 3/2008 |
| WO | 2006015394 A1 | 2/2006 |

* cited by examiner

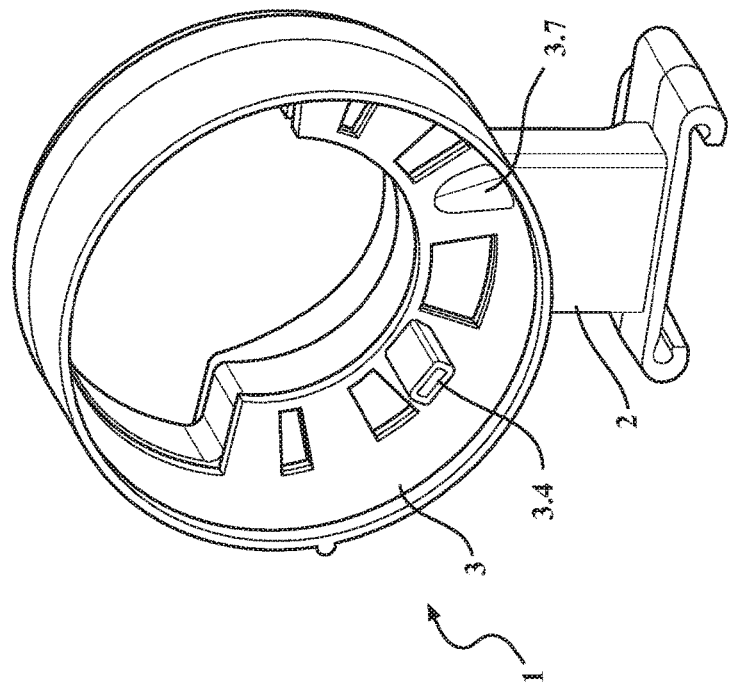
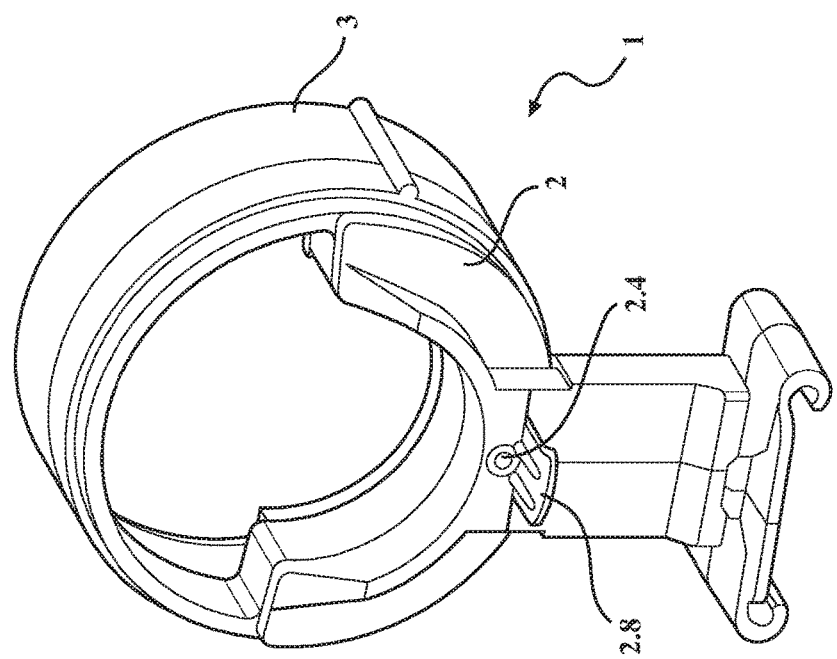
FIG. 1

OIL APPORTIONING

CROSS-REFERENCE TO RELATED APPLICATIONS

This application claims priority to German Application No. DE 10 2013 205 649.4, filed on Mar. 28, 2013, which is hereby incorporated by reference.

TECHNICAL FIELD

The present disclosure relates to a metering device for controlling an oil delivery rate for a wet-running clutch, wherein the wet-running clutch has at least one pair of interacting friction surfaces, and an actuation unit for actuating the wet-running clutch, wherein the actuation unit has an axially supported support disk and an axially displaceable thrust disk, wherein the thrust disk and the support disk are rotatable relative to one another.

BACKGROUND

This section provides background information related to the present disclosure which is not necessarily prior art.

A metering device is known from DE 10 2011 113 782 B3 which describes a metering device for the metered supply of a cooling fluid to a friction clutch. Here, the metering device has a first metering section which is assigned to a first ramp ring of a ramp mechanism and a second metering section which is assigned to a second ramp section of the ramp mechanism.

In the case of the stated use, during an actuation of the ramp mechanism, the first ramp ring is rotated relative to the second ramp ring, wherein the rotation also causes an axial displacement between the ramp rings, wherein the second metering section is likewise displaced axially with the second ramp ring.

SUMMARY

This section provides a general summary of the disclosure and is not a comprehensive disclosure of its full scope, objects and advantages.

It is an object of the present disclosure to improve a metering device for a wet-running clutch of the stated type, and in particular to specify a metering device which provides more accurate metering capability during actuation of the wet-running clutch.

The object is achieved by means of a metering device for controlling an oil delivery rate for a wet-running clutch, wherein the wet-running clutch includes clutch plates having at least one pair of interacting friction surfaces and an actuation unit for actuating the wet-running clutch, wherein the actuation unit has an axially supported support disk and an axially displaceable thrust disk, wherein the thrust disk and the support disk are rotatable relative to one another, wherein the metering device has a first component which is connected fixedly with respect to a housing, and wherein the metering device has a second component which is connected to the thrust disk in a rotationally conjoint and axially relatively displaceable manner.

The metering device of the present disclosure is preferably implemented with a wet-running clutch, wherein the wet-running clutch is in the form of a multiplate clutch. Multiplate clutches, such as a multi-disk clutch, have the advantage that they can be of small and compact design. The multiplate clutch is actuated by means of an actuation unit, wherein the actuation preferably takes place electromagnetically, electromechanically or hydraulically. The actuation unit has a ramp mechanism. The actuation forces of the actuation unit are variably adjustable, and thus the torque to be transmitted by the multiplate clutch is variably adjustable.

In this case, the ramp mechanism has an axially supported support disk and an axially displaceable thrust disk. Ball ramps of varying depths are arranged in the support disk and in the thrust disk in the face surfaces facing toward one another, wherein balls run in each of the ball ramps. During actuation of the wet-running clutch, the thrust disk is rotated relative to the support disk, wherein one of the thrust disk and the support disk is displaced axially relative to the other owing to the ramp mechanism.

In one embodiment of the invention, the wet-running clutch may be arranged in a transfer gear unit. Transfer gear units serve for the transmission of torques between two drive axles of motor vehicles, wherein the torque distribution can range from 0 to 100% between front axle and rear axle. Since the plates are cooled by means of a suitable cooling medium, high efficiency is achieved in relation to dry-running clutches, but with the disadvantage of a higher drag torque at idle. Drag torque is to be understood to mean the drag losses when the wet-running clutch is in the open state. Oil is preferably used for the cooling of the plates. It is however self-evident that any cooling medium known to a person skilled in the art may be used for the cooling of friction clutches.

By means of the metering device in accordance with the invention, the cooling medium supply to the wet-running clutch can be realized with a simple construction of the metering unit, wherein the coolant flow rate can be metered by rotation of the second component relative to the first component.

It is preferable for the first component and the second component of the metering device to be produced from plastic. Plastic is suitable because the components are subject to only very low loads. A further advantage lies in the low specific weight of the plastic. The parts can furthermore be produced in a relatively simple and inexpensive manner by means of injection moulding, for example.

In one preferred embodiment, the first component and the second component have oil passages, which communicate with one another, on mutually adjacent face surfaces. Here, the face surfaces are the cylindrical surfaces of the first component and the face surface of the second component, wherein the face surfaces are formed only in sections.

The first component and the second component interact with one another such that, in the event of a rotation of the two components relative to one another, the oil passages of the first component and the oil passages of the second component can communicate with one another. By means of the relative rotation of the two components, the oil passages are placed into partial or complete alignment. In a first end position of the rotatable second component, the oil passages of the first component and of the second component are closed, such that the oil passages are no longer in communication. The first end position is preferably reached when the multiplate clutch is aerated.

The face surfaces of the first component and of the second component adjoin one another in sealing fashion, with the exception of any leakage losses, in order to prevent an uncontrolled flow of cooling medium.

The geometry of the oil passages is adapted in accordance with the optimum cooling medium flow and may be freely configured in an application-specific manner. The passage cross section of the oil passages, which is variable by rotation of the second component relative to the first component, is designed such that, beyond a defined angle of rotation, the passage cross section is large enough that the plates of the wet-running clutch can be adequately supplied with cooling medium.

In a further embodiment of the invention, the first component is connected to the axially supported support disk. In a preferred embodiment, the first component can be connected to the axially supported support disk in a quick and simple manner by means of a detent connection. In a preferred embodiment, the first component has a fastening part, wherein the fastening part is formed in the manner of a tongue.

In one embodiment of the invention, the first component is connected via an oil line to an oil reservoir. Here, the oil that has collected in the oil line is conducted by the oil line from the oil reservoir to the first component. The oil line is sealingly connected to the first component and to the oil reservoir by plug-in connections. In one preferred embodiment, the first component has a pedestal on which there is formed a base, wherein the oil line can be connected to the first component by being clipped to the base. Since the pedestal is of hollow form, the oil from the oil line can be conducted into a cavity of the first component via the base, which is likewise provided with an opening, and through the hollow pedestal.

The first component has a first lubrication bore which is in communication with the oil line. The oil that is delivered through the oil line is conducted through the first lubrication bore to a first bearing point of the support disk. In one preferred embodiment, the first bearing point has a needle-roller bearing which is permanently lubricated.

The first component has a cavity in which the oil that is conducted through the oil line from the oil reservoir can collect. In the face surface which faces toward the second component and which is formed by the cavity, there are provided oil passages through which the oil that is situated in the cavity is conducted in the direction of the plates of the wet-running clutch when the second component is in a suitable position.

The oil reservoir has a geodetic height relative to the first component. Owing to the geodetic height, the oil is conducted through the oil line into the first component. Owing to the geodetic height of the oil reservoir relative to the first component, forced delivery, for example by means of a pump, is not necessary.

The oil reservoir is preferably arranged at a chain. The chain permanently conveys oil from an oil sump, for example in a transfer gear unit, into the oil reservoir. The oil that has collected in the oil container is conveyed into the oil reservoir by the chain that is situated in the transfer gear unit.

An inner wall of a transfer gear cover jointly forms a part of the oil reservoir, preferably a wall. That part of the oil reservoir which is manufactured from plastic is connected in a suitable manner to the transfer gear cover.

The transfer gear unit preferably has, on the inner wall of the transfer gear cover, a scraper lip which scrapes off the oil that is conveyed along by the chain and which conducts said oil into the oil reservoir.

The chain serves for the transmission of the torque between two drive shafts via so-called sprockets. The chain is preferably produced from multiple links which are movably connected to one another by means of cradle-type joints, and is in particular used in the case of a large gear spacing. The chain is also used for acoustic reasons and owing to its high efficiency at all transmission ratios and in all load states.

In one preferred embodiment of the invention, the first component is designed such that the oil flow through the oil line is diverted such that the oil is conducted into a cavity of the first component, wherein the first component has at least one first lubrication bore which is designed for the permanent lubrication of a first bearing point, for example of a needle-roller bearing, of the support disk. Permanent lubrication is also to be understood to mean a situation in which lubrication is only possible for as long as the chain conveys oil into the oil reservoir.

In one preferred embodiment, the second component is connected to the first component by being plugged onto the latter. Here, the second component is pushed onto the first component until the two face surfaces of the first component and of the second component are in contact with one another. Here, the second component has a face surface section which is designed correspondingly to the geometry of the face surface of the first component. The geometry of the oil passages of the second component is substantially adapted to the geometry of the oil passages of the first component. Positioning of the second component with respect to the first component is realized by means of the connection of the second component to the thrust disk by means of the axially arranged rib, because the position of the thrust disk with respect to the support disk is clearly defined, as a result of which, because the first component is fastened to the support disk, the oil passages of the first component and of the second component are assigned to one another in a defined manner.

The second component is connected to the axially displaceable thrust disk. Since an axial displacement of the second component relative to the first component is undesirable, at least one rib is provided, in accordance with the invention, on the second component, said at least one rib extending in an axial direction on the outer circumferential surface of the second component. The thrust disk, which is loosely connected to the second component, has a depression in a circumferential surface in the axial direction, wherein the depression is geometrically adapted to the form of the rib, such that the thrust disk can be displaced axially along said rib during an actuation of the wet-running clutch.

In one preferred embodiment, the axially displaceable thrust disk has a toothed wheel segment or worm wheel segment. The toothed wheel segment or worm wheel segment is engaged into by a corresponding toothed wheel or worm, and rotates the thrust disk in the event of actuation.

Owing to the at least one rib which extends axially on the outer circumferential surface, the second component is connected rotationally conjointly to the thrust disk and, during a rotation of the thrust disk, is correspondingly co-rotated, whereby the oil passages in the face wall of the first component and of the second component are, in accordance with the angular position, aligned with one another to a greater or lesser extent, or in a first end position are closed, and conduct the oil in the direction of the plates for the purpose of cooling of the wet-running clutch. The second component has, on the face surface, a lubrication bore through which the bearing point of the sprocket can be permanently lubricated.

The second component has a third lubrication bore through which a third bearing point, for example a needle-roller bearing, can be permanently lubricated. Said needle-roller bearing is designed for the mounting of the thrust disk. Said third lubrication bore extends through both the circumferential surface and also the face surface. In a further embodiment in accordance with the invention, the second component has, on its circumferential surface, at least one second lubrication bore through which the oil for the lubrication of the second component is conducted in between the circumferential surface of the second component and the thrust disk through the second lubrication bore of the circumferential surface of the second component. It is ensured in this way that, owing to the lubrication, only low friction forces arise during an axial displacement of the thrust disk relative to the second component. The at least one second lubrication bore on the circumferential surface of the second component also serves for the lubrication of the second bearing point, for example of a needle-roller bearing which is designed for the mounting of the thrust disk, when an oil flow to the wet-running clutch is effected by means of rotation of the second component relative to the first component.

Further areas of applicability will become apparent from the description and specific examples in this summary are intended for purposes of illustration only and are not intended to limit the scope of the present disclosure.

DRAWINGS

The drawings described herein are for illustrative purposes only of selected embodiments and not all possible implementations such that they are not intended to limit the scope of the present disclosure. The selected embodiments to be described are shown in the drawings wherein:

FIG. 1 is a perspective view of a metering device in accordance with the invention from the front (left-hand view) and from the rear (right-hand view);

DESCRIPTION

Figure 2:
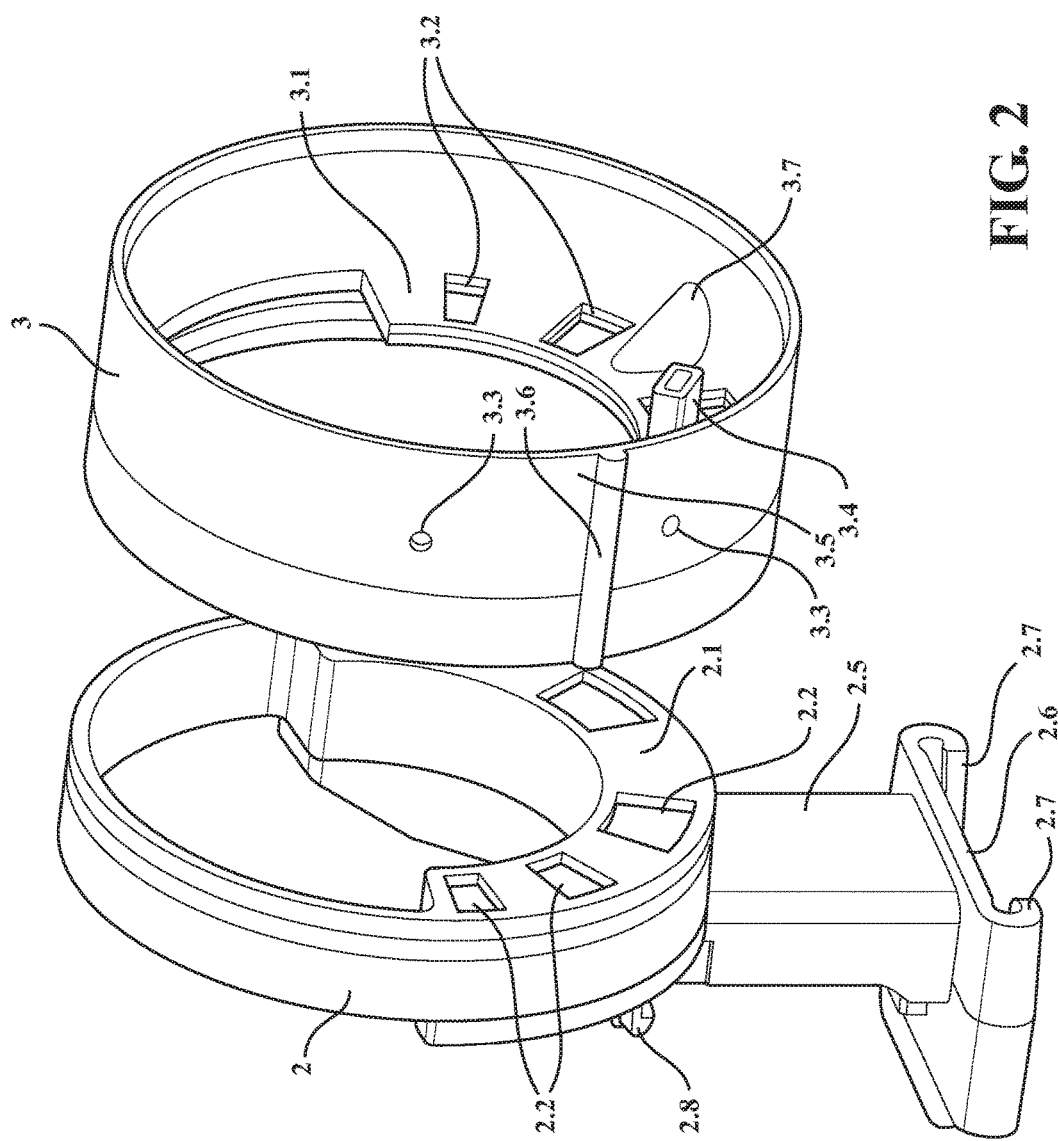
FIG. 2 is an exploded perspective view of the metering device shown in FIG. 1.

Example embodiments of the invention will now be described more fully with reference to the drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of disclosure. In some example embodiments, well-known processes, well-known device structures, and well-known technologies are not described in detail.

FIG. 1 illustrates a metering device 1 in accordance with the invention in a perspective view from the front (left-hand view) and from the rear (right-hand view). The metering device 1 is composed of a first component 2 and a second component 3. The first component 2 is connected, fixedly with respect to a housing associated with a transfer gear unit (not illustrated). In a preferred embodiment, the second component 3 is connected to the first component 2 by being plugged onto the latter. A first lubrication bore 2.4 serves for the permanent lubrication of a first bearing point of a support disk 4 in accordance with the invention (see FIG. 3), and a fastening part 2.8 in the form of a tongue serves for the connection of the first component 2 to the support disk 4 (see FIG. 3), wherein, during the connection, the first component 2 is locked to the support disk 4 with detent action. The second lubrication bore 3.4 and the third lubrication bore 3.7 are designed for the permanent lubrication of second and third bearing points. In a preferred embodiment, the first component 2 and the second component 3 are produced from plastic in an injection moulding process.

FIG. 2 is an exploded view illustrating the metering device 1 as per FIG. 1. The first component 2 is substantially annular and has an inwardly extending segment in the shape of a partial circle. The inwardly extending segment extends from the circumferential surface of the first component 2 and has a face surface 2.1 which is assigned to a face surface 3.1 of the second component 3. In the face surface 2.1 there is provided at least one oil passage 2.2 through which oil can flow into the wet-running clutch when the oil passage 2.2 of the first component 2 is at least partially in alignment with the oil passage 3.2 of the second component 3. The geometry of the oil passages 2.2 and 3.2 is adapted to the metering device 1 in accordance with requirements. The first lubrication bore 2.4 is arranged on the rear side of the first component 2 and serves for the lubrication of a bearing point of the support disk 4. The second component 3, which is of substantially annular form, has at least one second lubrication bore 3.3 on the circumferential surface 3.5. The at least one second lubrication bore 3.3 serves for the lubrication of the circumferential surface of the second component 3 and of the thrust disk 5 (see FIG. 4). The at least one second lubrication bore 3.3 also serves for the lubrication of the second bearing point of the thrust disk 5, wherein lubrication is performed only when an oil flow passes to the wet-running clutch. The second component 3 has, in the region of the face surface 3.1, a further lubrication bore 3.4 which serves for the permanent lubrication of a second bearing point of a sprocket (not illustrated).

Figure 4:
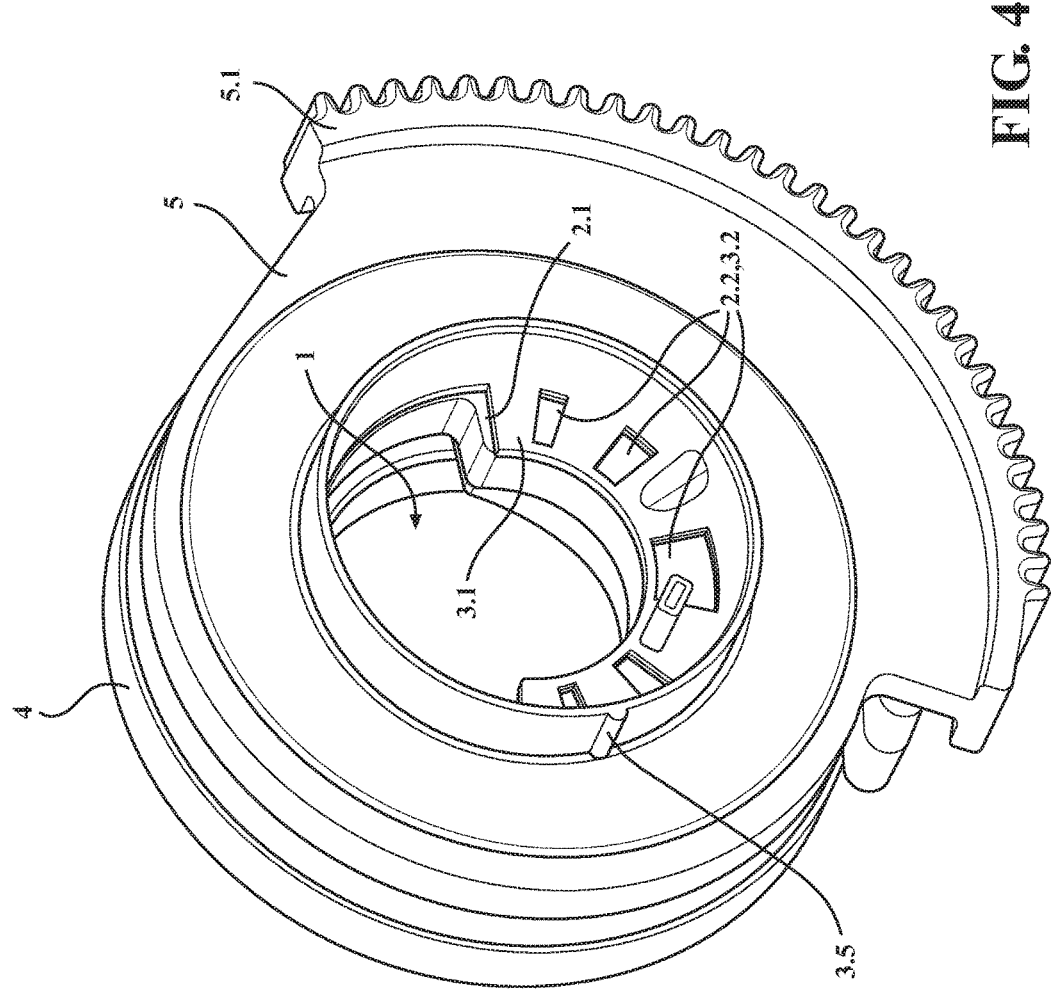
FIG. 4 illustrates a perspective view of the metering device as per FIG. 3, wherein a thrust disk is connected to the support disk.

The third lubrication bore 3.7 extends through the circumferential surface 3.5 and the face surface 3.1 of the second component 3 and serves for the permanent lubrication of a third bearing point of the thrust disk 5 (see FIG. 4). The second component 3 has a face surface 3.1 which is in the form of a segment of a circle and which corresponds substantially to the geometry of the face surface 2.1 of the first component 2. At least one oil passage 3.2 is provided in the face surface 3.1, wherein the number, position and geometry of the oil passages 3.2 of the second component 3 are adapted to the number, position and geometry of the oil passages 2.2 of the second component 2 such that the desired oil flow rate can pass into the wet-running clutch in the event of a rotation of the second component 3. The second component 3 has at least one axially extending rib 3.6 on the circumferential surface 3.5, wherein the rib 3.6 is arranged in the region of the second lubrication bore 3.3. The first component 2 has a pedestal 2.5 which is of hollow form. Beneath the pedestal 2.5 there is a base 2.6 with wraparound portions 2.7 which are designed for connection to an oil line 9 (see FIG. 6). By virtue of the oil line 9 being securely clipped into the base 2.6, the oil line 9 is held securely in position by the wraparound portions 2.7. An opening (not shown) in the base 2.6 communicates with the oil line 9 to supply oil through the hollow pedestal 2.5 to the cavity 2.3. A seal (not illustrated) on the oil line 9 prevents leakage and an undesired escape of oil in the region of the fastening of the oil line 9 to the base 2.6.

A fastening part 2.8, such as is also illustrated in FIG. 1, serves for the fastening of the first component 2. The first component 2 is in this case locked to the axially supported support disk 4 with detent action, and thereby connected fixedly with respect to a housing, by means of a clipping action of the fastening part 2.8 (not illustrated). The expression "connected fixedly with respect to a housing" is to be understood to mean that the first component 2 cannot perform a relative movement with respect to the transfer gear housing (not illustrated). Owing to the clipping action, the first component 2 and the support disk 4 are connected to one another in a positionally accurate manner by locking with detent action.

Figure 3:
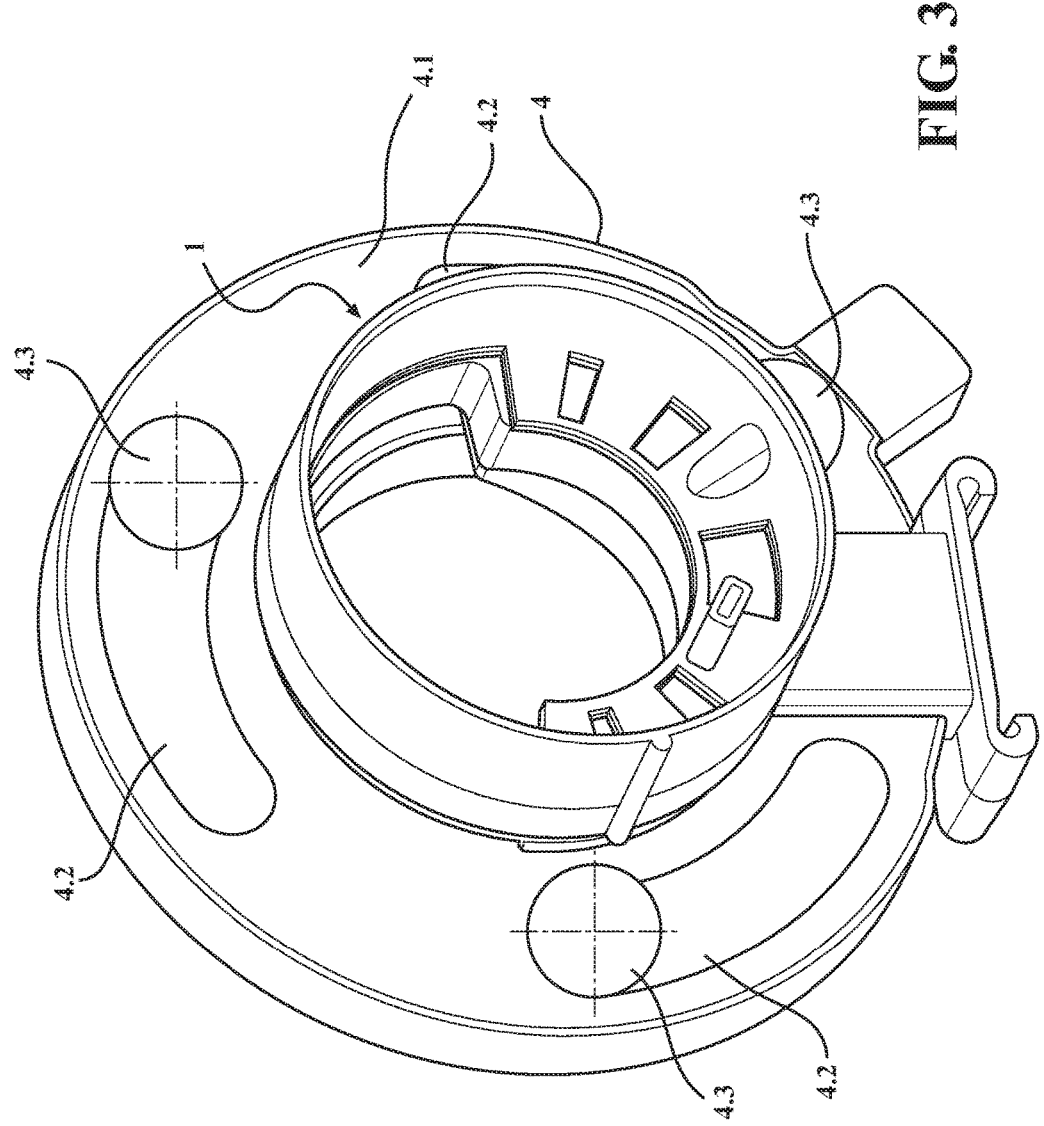
FIG. 3 illustrates a perspective view of the metering device connected to a support disk.

FIG. 3 illustrates the metering device 1 in accordance with the invention, wherein the metering device 1 is fixedly connected to the support disk 4 by means of the fastening part 2.8 (see FIG. 1). The support disk has a face surface 4.1 in which ramps 4.2 of varying depths are formed. In the ramps 4.2 there are arranged balls 4.3 which, in the event of actuation, are supported against the thrust disk 5.

FIG. 4 illustrates a perspective view of the metering device 1 as per FIG. 3, wherein the thrust disk 5 is connected to the support disk 4. On the face surfaces assigned to the face surface 4.1 from FIG. 3, the thrust disk 5 likewise has ramps of variable depth, in which ramps the balls 4.3 from FIG. 3 are supported. Owing to the ramp mechanism of the support disk 4 and of the thrust disk 5, the two components are connected to one another in a defined manner. A depression in the thrust disk 5 serves for connection to the second component 3, wherein the rib 3.6 is guided in the depression of the thrust disk 5. Owing to the positioning of the second component 3 with the thrust disk 5, the first component 2 and the second component 3 are positioned relative to one another in a defined manner. The thrust disk 5 has a toothed wheel segment or worm wheel segment 5.1 which is actuated by an actuation unit.

During the actuation, the thrust disk 5 is rotated, wherein the second component 3, which is connected rotationally conjointly to the thrust disk 5 owing to the rib 3.6, is likewise rotated. Since the thrust disk 5 is supported by means of the ball ramp mechanism, an axial displacement occurs simultaneously here, wherein the thrust disk 5 can slide axially along the rib 3.6 relative to the second component 3. A lubrication bore 3.3 (see FIG. 2) in the region of the rib 3.6 lubricates the circumferential surfaces of the second component 3 and of the thrust disk 5, whereby the friction forces are reduced. The face surface 2.1 of the first component 2 and the face surface 3.1 of the second component 3 thus always bear sealingly against one another even during the actuation of the wet-running clutch, whereby the oil can flow directly through the oil passages 2.2 and 3.2 (see FIG. 2) to the plate pack of the wet-running clutch.

Figure 5:
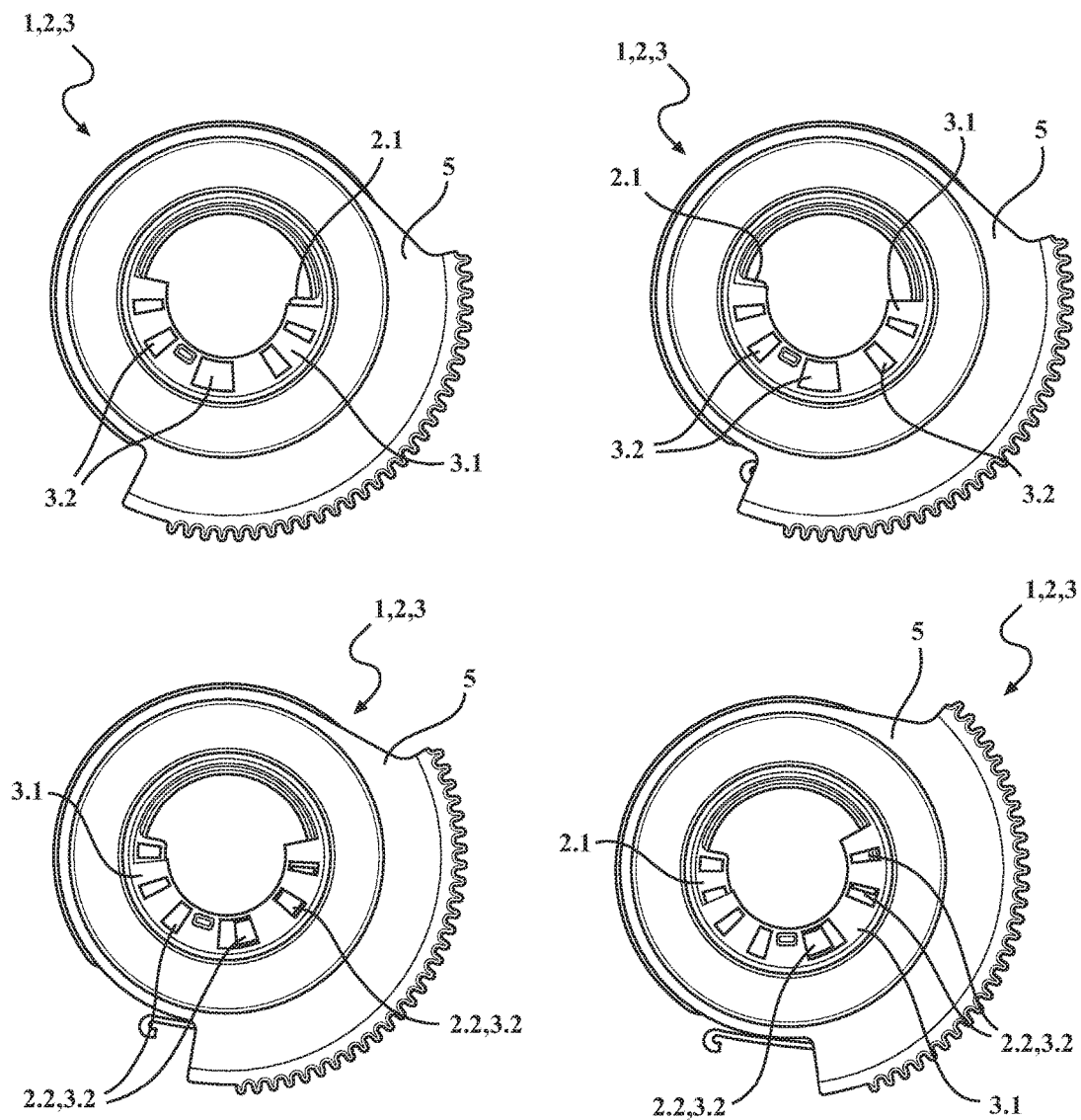
FIG. 5 illustrates four front views as per FIG. 4, wherein the metering device with thrust disk is illustrated in four preferred angles of rotation.

FIG. 5 illustrates four front views as per FIG. 4. The upper left view illustrates no relative rotation (0° rotation) between the first component 2 and the second component 3. The upper right view illustrates the second component 3 rotated relative to the first component 2 by approximately 5°. Since the angle of rotation is small, the oil passages 2.2 of the first component 2 and the oil passages 3.2 of the second component 3 are closed, that is to say the oil passages 2.2 and 3.2 are not in alignment with one another. In the lower left view, the second component 3 has been rotated relative to the first component 2 through approximately 20°. The oil passages 2.2 and 3.2 are partially in alignment and oil can flow in the direction of the plates of the wet-running clutch. It is ensured already beyond a rotation of approximately 10° that a sufficient amount of oil passes into the clutch. Here, the open cross section has an area required by the wet-running clutch for an adequate supply of oil. The lower right view illustrates a relative rotation of approximately 30°. The oil passages 2.2 and 3.2 are least partially in almost complete alignment.

Figure 6:
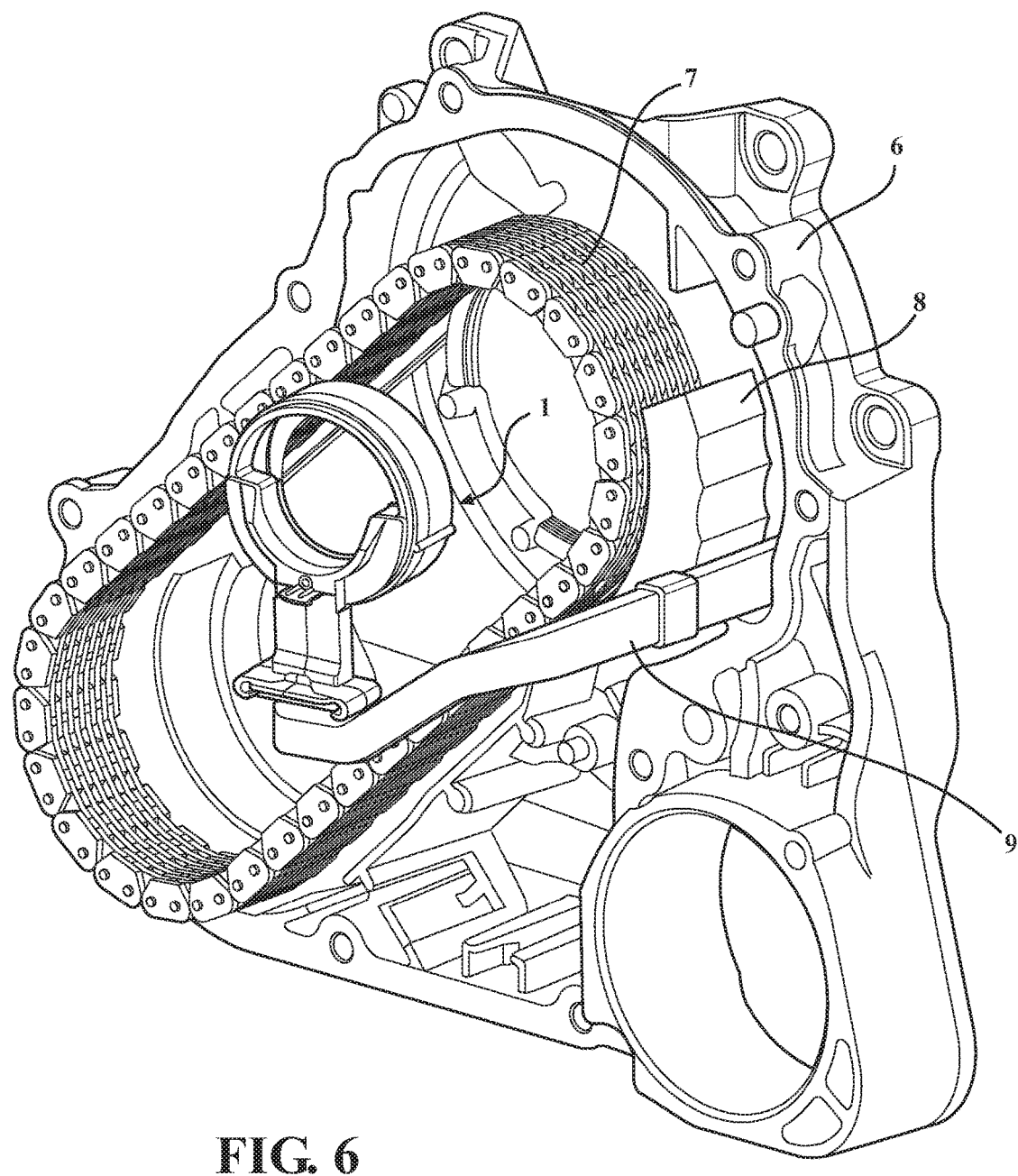
FIG. 6 illustrates a perspective view of the metering device arranged in a transfer gear unit (only partially illustrated)

FIG. 6 illustrates a perspective view of the metering device 1 arranged in a transfer gear unit, wherein the transfer gear unit is only partially illustrated. A better overview is thus provided. On the transfer gear cover 6 there is arranged a chain 7, wherein the chain serves for the transmission of a drive torque between two drive shafts (not illustrated). Since the construction and function of a transfer gear unit is well known to a person skilled in the art, a detailed description of the construction of the transfer gear unit is omitted. The chain 7 conveys further oil from an oil sump, wherein the oil is scraped off and conducted into the oil reservoir 8 by a scraper lip 6.1 which is not illustrated (see FIG. 7). The oil reservoir 8 has a geodetic height in relation to the metering device 1, whereby the oil through the oil line 9 from the oil reservoir 8 to the metering device 1, and depending on the rotational position of the metering device 1, onward to a wet-running clutch (not illustrated) and/or to the bearing points (not illustrated) of the support disk and thrust disk, without a delivery device, for example a pump. The oil line 9 is sealingly connected to the oil reservoir 8 and to the metering device 1.

Figure 7:
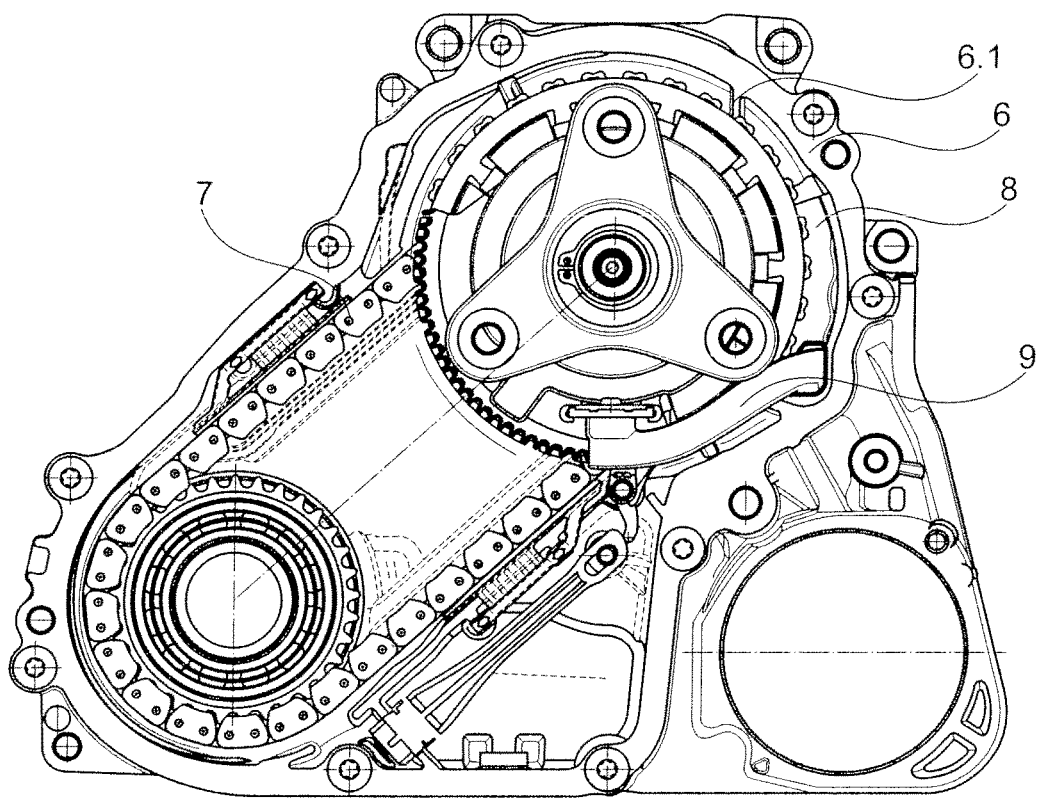
FIG. 7 illustrates a front view of the metering device arranged in a transfer gear unit (only partially illustrated).

FIG. 7 illustrates a front view of the transfer gear unit, wherein the transfer gear unit is only partially illustrated. The transfer gear cover 6 has a scraper lip 6.1 by means of which the oil that is conveyed along by the chain 7 is delivered into the oil reservoir 8. Here, the chain 7 rotates anticlockwise. The scraper lip 6.1 prevents the oil that is carried along by the chain 7 from being conveyed onward by the chain 7, whereby a build-up of said oil is caused by the scraper lip 6.1 and said oil subsequently flows into the oil reservoir 8. The oil reservoir 8 is designed such that the transfer gear cover 6 jointly forms a wall of the oil reservoir 6. In a preferred embodiment, the oil reservoir 8 and oil line 9 are produced from plastic by injection moulding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

1 Metering device
2 First component
2.1 Face surface
2.2 Oil passage
2.4 First lubrication bore
2.5 Pedestal
2.6 Base
2.7 Wraparound portions 2.8 Fastening part
3 Second component
3.1 Face surface
3.2 Oil passage
3.3 Second lubrication bore
3.4 Third lubrication bore
3.5 Circumferential surface
3.6 Rib
3.7 Lubrication bore
4 Support disk
4.1 Face surface
4.2 Ramp
4.3 Ball
5 Thrust disk
5.1 Toothed wheel segment worm wheel segment
6 Transfer unit gear cover
6.1 Scraper lip
7 Chain
8 Oil reservoir
9 Oil line

What is claimed is:

1. A metering device for use with a wet-running clutch having an actuation unit with an axially supported support disk and a thrust disk axially displaceable relative to the support disk as a result of rotation of the thrust disk relative to the support disk, the metering device operable to control an oil delivery rate to the wet-running clutch and comprising a first component which is connected fixedly with respect to a housing, and a second component which is connected to the thrust disk in a rotationally conjoint and axially relatively displaceable manner, wherein the first component is fluidically connected to an oil reservoir having a geodetic height relative to the first component;
    wherein the oil reservoir is arranged at a chain, and wherein the chain conveys the oil into the oil reservoir;
    wherein an inner wall of a transfer gear cover forms a delimitation of the oil reservoir; and
    wherein the transfer gear cover has a scraper lip, wherein the scraper lip scrapes off the oil that is conveyed along by the chain, and conducts the oil into the oil reservoir.

2. The metering device in accordance with claim 1, wherein the metering device is arranged in a transfer gear unit.

3. The metering device in accordance with claim 1, wherein the first component and the second component are produced from plastic.

4. The metering device in accordance with claim 1, wherein the first component and the second component have oil passages, which communicate with one another, on mutually adjacent face surfaces.

5. The metering device in accordance with claim 1, wherein the first component and the second component interact with one another such that an oil flow in the direction of the wet-running clutch is permitted or such that the oil flow to the wet-running clutch is prevented.

6. The metering device in accordance with claim 1, wherein the first component is connected to the axially supported support disk.

7. The metering device in accordance with claim 1, wherein the first component has a first lubrication bore for lubrication of a first bearing point.

8. The metering device in accordance with claim 7, wherein the second component has a second lubrication bore for lubrication of a second bearing point.

9. The metering device in accordance with claim 8, wherein the second component has a third lubrication bore for lubrication of a third bearing point.

10. The metering device in accordance with claim 1, wherein the first component diverts an oil flow, wherein the first component has a lubrication bore in communication with an oil line connected to the oil reservoir.

11. A metering device for use with a wet-running clutch having an actuation unit with an axially supported support disk and a thrust disk axially displaceable relative to the support disk as a result of rotation of the thrust disk relative to the support disk, the metering device operable to control an oil delivery rate to the wet-running clutch and comprising a first component which is connected fixedly with respect to a housing, and a second component which is connected to the thrust disk in a rotationally conjoint and axially relatively displaceable manner, wherein the first component is fluidically connected to an oil reservoir having a geodetic height relative to the first component;
    wherein the second component is connected to the first component by being plugged onto the latter.

12. A metering device for use with a wet-running clutch having an actuation unit with an axially supported support disk and a thrust disk axially displaceable relative to the support disk as a result of rotation of the thrust disk relative to the support disk, the metering device operable to control an oil delivery rate to the wet-running clutch and comprising a first component which is connected fixedly with respect to a housing, and a second component which is connected to the thrust disk in a rotationally conjoint and axially relatively displaceable manner, wherein the first component is fluidically connected to an oil reservoir having a geodetic height relative to the first component;
    wherein the second component has a rib, and wherein the rib permits an axial displacement of the thrust disk relative to the second component.

13. The metering device in accordance with claim 12, wherein the second component is connected rotationally conjointly to the thrust disk by means of the rib.

14. A metering device for use with a wet-running clutch having an actuation unit with an axially supported support disk and a thrust disk axially displaceable relative to the support disk as a result of rotation of the thrust disk relative to the support disk, the metering device operable to control an oil delivery rate to the wet-running clutch and comprising a first component which is connected fixedly with respect to a housing, and a second component which is connected to the thrust disk in a rotationally conjoint and axially relatively displaceable manner, wherein the first component is fluidically connected to an oil reservoir having a geodetic height relative to the first component;
    wherein the second component has at least one lubrication bore on a circumferential surface.

* * * * *